(12) United States Patent
Gopal

(10) Patent No.: US 7,047,289 B1
(45) Date of Patent: May 16, 2006

(54) MIB DETECTING DATA MODIFICATION IN MIB TABLES IN AN SNMP COMMAND RESPONDER

(75) Inventor: Niraj Gopal, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 756 days.

(21) Appl. No.: 09/884,801

(22) Filed: Jun. 18, 2001

(51) Int. Cl.
*G06F 15/173* (2006.01)
*G06F 17/30* (2006.01)

(52) U.S. Cl. ........................................ 709/223; 707/10

(58) Field of Classification Search ............... 709/223, 709/224; 702/103; 719/314–316
See application file for complete search history.

(56) References Cited

U.S. PATENT DOCUMENTS

| | | | | |
|---|---|---|---|---|
| 6,052,724 A | * | 4/2000 | Willie et al. | 709/223 |
| 6,076,107 A | * | 6/2000 | Chen et al. | 709/224 |
| 6,122,639 A | * | 9/2000 | Babu et al. | 707/103 R |
| 6,278,694 B1 | * | 8/2001 | Wolf et al. | 370/253 |
| 6,766,367 B1 | * | 7/2004 | Stevenson et al. | 709/223 |

OTHER PUBLICATIONS

Waldbusser, S., Remote Network Monitoring Management Information Base, Jan. 1997, RFC, www.ietf.org, Version 2, 1-130.*
Stallings, William, SNMP, SNMP2, SNMP3, and RMON 1 and 2, 1996, Adison-Wesley, 85-119.*

* cited by examiner

*Primary Examiner*—Marc D. Thompson
*Assistant Examiner*—J. Bret Dennison
(74) *Attorney, Agent, or Firm*—Thelen Reid & Priest LLP; David R. Ritchie

(57) ABSTRACT

A method and apparatus for detecting data modifications in MIB tables utilizes a network device having a table registrar, a notification controller, a table modification recorder and a row modification recorder. A Network Management System (NMS) registers a table to be monitored with the table registrar and enables the notification controller when observation of change notifications is desired. With the assistance of a modification count and a timestamp from the table modification recorder, the NMS can determine whether a modified row should be retrieved from the row modification recorder to find data that has been modified since the last poll.

16 Claims, 3 Drawing Sheets

MIB DETECTING DATA MODIFICATION IN MIB TABLES IN AN SNMP COMMAND RESPONDER

FIELD OF THE INVENTION

The present invention relates generally to management of data communications networks. More specifically, the present invention relates to a Management Information Base (MIB) for detecting data modifications in MIB tables of a Simple Network Management Protocol (SNMP) command responder.

BACKGROUND OF THE INVENTION

A successful communication network depends in large part on planning. Part of planning includes designing the various devices in the network for ease of management. To this end, a communication protocol known as Simple Network Management Protocol (SNMP) was developed and is commonly utilized. SNMP commands include GET for reading information and SET for configuring information. In general, the management of the network is controlled by a Network Management System (NMS). Each device in the network running a SNMP agent has a set of variables about itself which the management applications in the NMS query at regular intervals. Each set of variables is known as a Management Information Base (MIB). Some MIB variables may depend on other variables. The values for the variables are typically stored in a table. There may be many tables in a particular MIB and there may be more than one MIB for each device. The size of a MIB table may vary from a few values to hundreds or even thousands of values depending on the device. Devices may include routers, switches, access servers, and the like.

Conventionally, when the management applications in the NMS query a MIB table, the entire contents of the table are transmitted from the agent to the NMS. If the table is large and the changes since the last poll are few, then this process is inefficient.

A definite need exists for a more efficient means for detecting data modifications in MIB tables by an SNMP NMS device. Specifically, a need exists for a method and apparatus that may be capable of monitoring changes and reporting when and what changes have occurred and by whom. Ideally, such a means would be user friendly, robust, quick, and accurate.

BRIEF DESCRIPTION OF THE INVENTION

A method and apparatus for detecting data modifications in MIB tables utilizes a network device having a table registrar, a notification controller, a table modification recorder, and a row modification recorder. A Network Management System (NMS) registers a table to be monitored with the table registrar and enables the notification controller when observation of change notifications is desired. With the assistance of a modification count and a timestamp from the table modification recorder, the NMS can determine whether a modified row should be retrieved from the row modification recorder to find data that has been modified since the last poll.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a method and apparatus for detecting data modifications in MIB tables in a SNMP command responder. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the specific goals of the developer, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature may also be used without departing from the scope and spirit of the inventive concepts disclosed herein.

The present invention provides network devices with a process for detecting data modifications in MIB tables. In this way, when the management applications in the NMS query a MIB table, the entire contents of the table may not have to be transmitted to the NMS. The process may be applied to all MIB tables in a device or only select tables such as those exceeding a certain size or polling frequency. It is not necessary for every device in the network to incorporate the process, but the NMS must be compatible for any benefit to be realized. Devices that incorporate the process will operate conventionally with a non-compatible NMS. Likewise, devices that do not incorporate the process will operate conventionally with a compatible NMS. The entire detection process or select portions of the process may be disabled in one or more of the devices or in the NMS.

Figure 1:
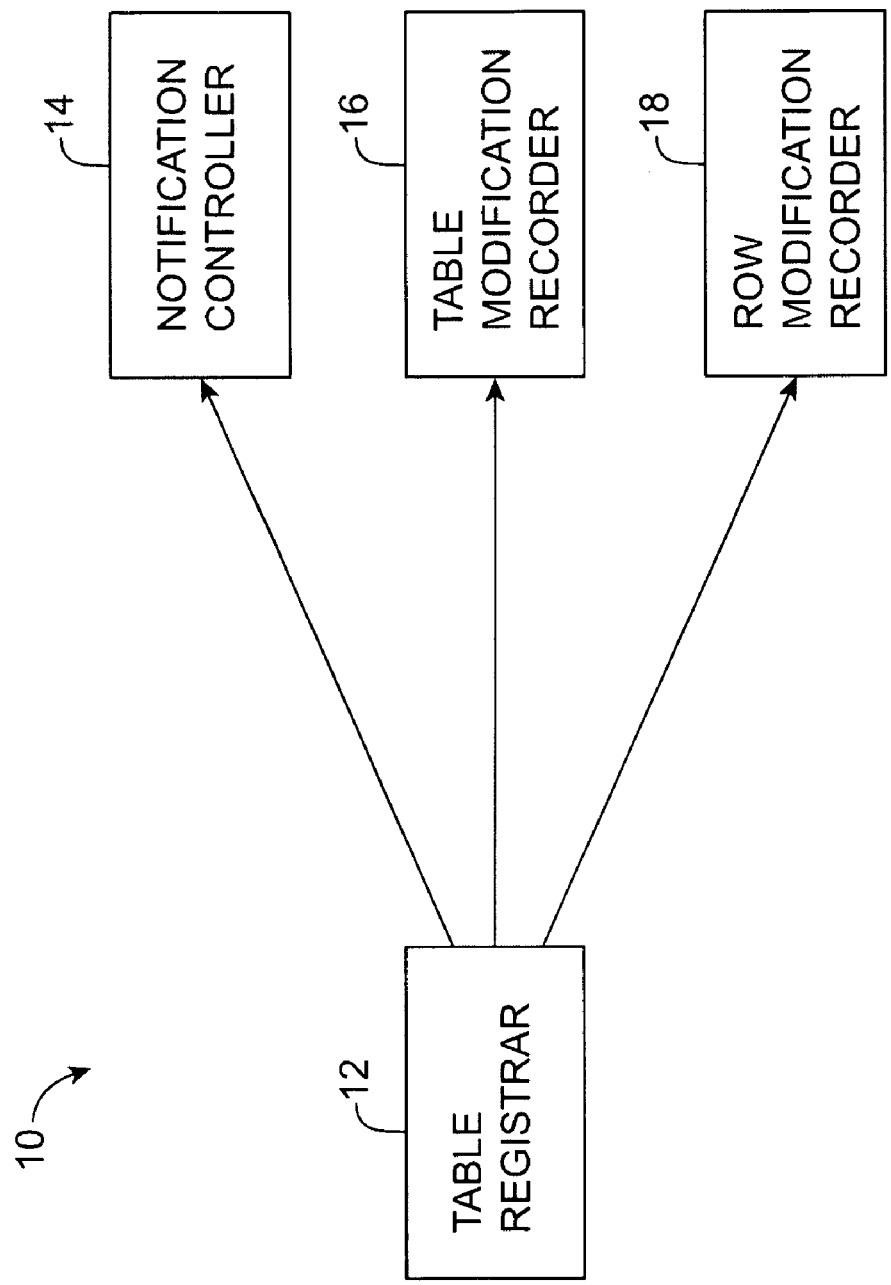
FIG. 1 is a block diagram of a system for detecting data modifications in MIB tables.

Turning first to FIG. 1, a block diagram of a system for detecting data modifications in MIB tables 10 is shown. The system 10 is incorporated into a network device and includes a table registrar 12, a notification controller 14, a table modification recorder 16, and a row modification recorder 18. The organization of the elements of the system 10 is not rigid and the elements may be reorganized to suit the particular circumstances. There are different table modifications that may be detected. Three of these include the creation of a row in the MIB table, the deletion of a row in the table, and the modification of one or more MIB objects in a row of the table. The device may detect various table modifications even though the NMS can not or will not utilize any or all of this information. The NMS may enable or disable detection by the device of select table modifications.

The table registrar 12 contains a listing of all of the MIB tables that are to be monitored for modifications. In addition, the type of modifications to be monitored must be identified. A table in the list may come pre-registered or may be registered by an NMS. Once registered, a table on the list may also be unregistered. The system 10 will monitor a MIB table for the specified type of changes while the table remains registered. A callback function will be registered for each registered table. When a registered table experiences a modification, the process implementing this MIB table calls the callback function to log a modification record. The table registrar 12 may be implemented as a table with each registered table having a row in the table.

The notification controller 14 contains a list of each NMS that has registered a table with the table registrar 12. The NMS is added to the list of the notification controller 14 when at least one table is registered and is removed from the list when all of the registered tables become unregistered. The notification controller 14 generates the notices as prescribed by the NMS. The NMS may selectively disable the notice generation of the notification controller 14 for a particular table. This is as opposed to unregistering the table with the table registrar 12. The notification controller 14 may keep a running total of the number of notifications generated. The notification controller 14 may be implemented as a table with each NMS with a registered table having a row in the table.

The table modification recorder 16 contains a list of which tables have been modified, a timestamp as to when the last modification occurred for a particular table, and a count of the number of modifications that have occurred to that table. There will be one entry for every registered MIB table that has been modified. The entry is updated by the callback function. For counting purposes, an instruction from any source that changes the table, even if multiple rows or entries are changed by the instruction, will be counted as one modification. The source of instructions may include other network members, a user, or the device itself. Based on the contents of the list in the table modification recorder 16, an NMS can determine whether it is necessary to retrieve all or part of a modified table. The table modification recorder 16 may be implemented as a table with each modified MIB table having a row in the table.

The row modification recorder 18 contains a list of which rows of a registered table have been modified, the type of modification, the source of the modification, and a copy of the row as modified. Further, the row modification recorder 18 may identify, by name or address, the source of the instruction that modified the table. The history entry is generated by the callback function. Depending on the particular table, it may be necessary or desirable to limit the number of history entries for the table. This limit may be based on the number of entries or the time of the entries and may be preset or set by the NMS. Once the limit is reached, the oldest entry is replaced by the most recent entry. It may be desirable to track the number of discarded entries to determine whether the polling frequency, the entry limit number, or both are correct. The row modification recorder 18 may be implemented as a table with each modification of a row of a registered MIB table having a row in the table.

Figure 2:
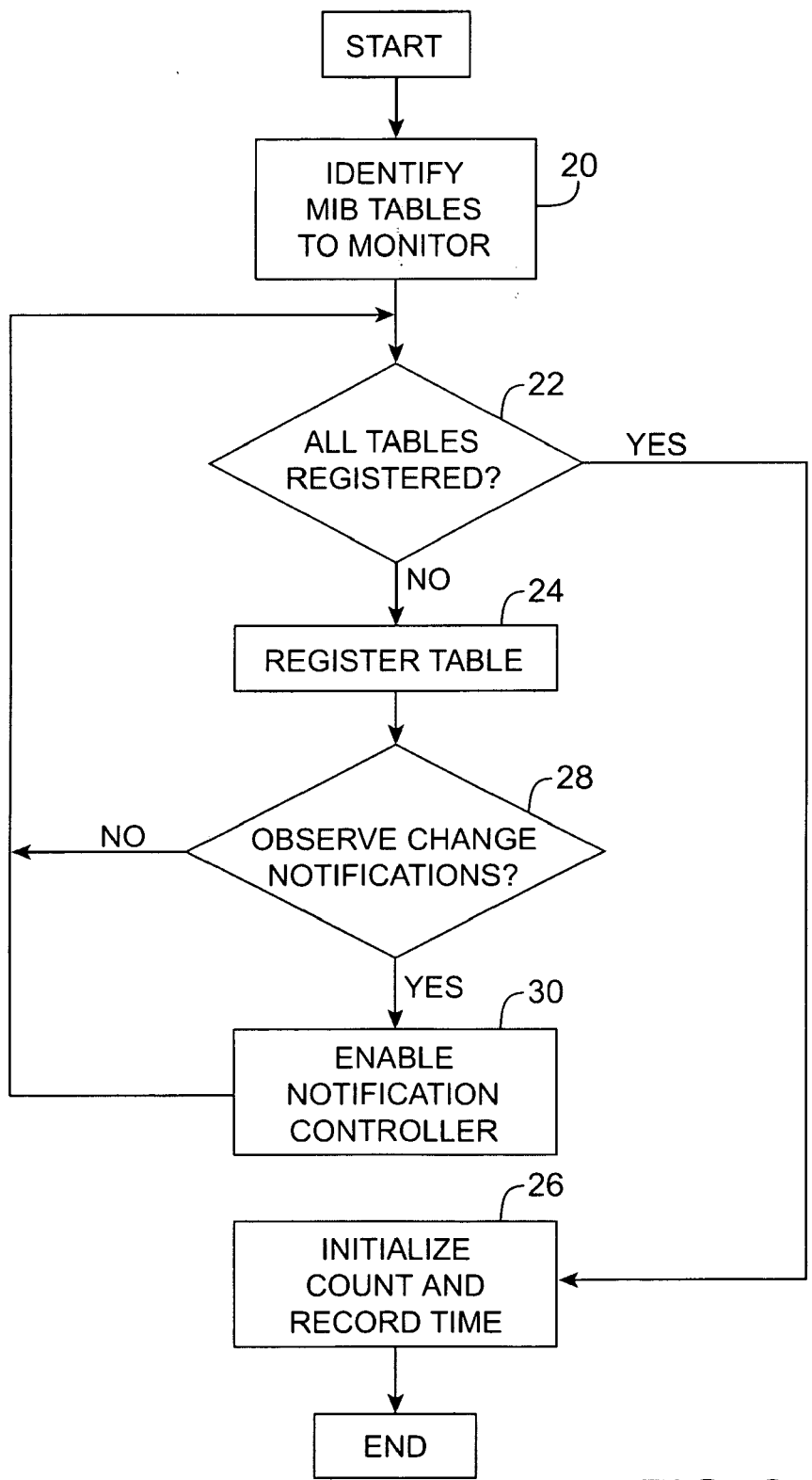
FIG. 2 is a logic flow diagram of a process for initializing a system for the detection of data modifications in MIB tables.

Turning now to FIG. 2, a logic flow diagram of a process for initializing a system for the detection of data modifications in MIB tables is shown. The process begins at START. At block 20, the process identifies at least one MIB table to be monitored for modifications. At decision block 22, the process determines whether all of the tables identified in block 20 have been registered. If so, the process continues with block 24 and if not, the process continues with block 26. Assuming that at least one of the tables has not been registered, then at block 24, the unregistered table is registered with the table registrar 12 of FIG. 1. Next, at decision block 28, the process determines whether the observation of change notifications is desired or required. If so the process continues with block 30 and if not, the process returns to decision block 22. Assuming that the observation of change notifications is desired or required, then at block 30, the notification controller 14 of FIG. 1 is enabled for the MIB table being registered and the process returns to decision block 22. Blocks 22, 24, 28, and 30 are repeated until all of the tables identified in block 20 have been registered. Returning to decision block 22 and assuming that all of the tables have been registered, then at block 26, the process initializes, in the table modification recorder 16 of FIG. 1, the count of the number of modifications that have occurred to each table to a value of zero and initializes the timestamp as to when the last modification occurred for a particular table to the present time. After block 26, the initialization of the system is complete and the process of FIG. 2 ends.

Figure 3:
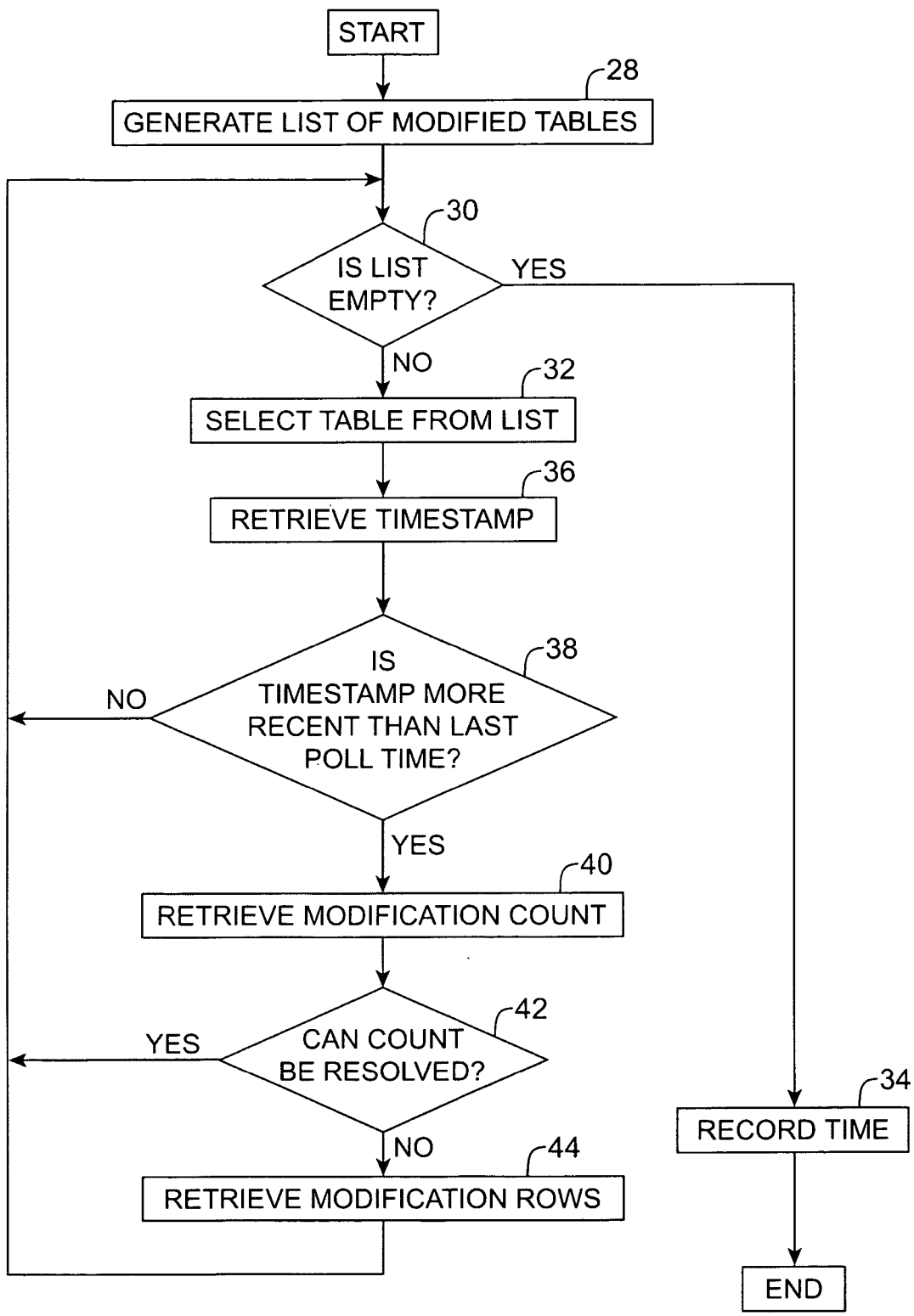
FIG. 3 is a logic flow diagram of a process for the detection of data modifications in MIB tables.

Turning now to FIG. 3, a logic flow diagram of a process for the detection of data modifications in MIB tables is shown. The process begins at START. At block 28, the process generates a list of at least one MIB table that has been modified. At decision block 30, the process determines whether all of the tables listed in block 28 have been analyzed. If so, the process continues with block 34 and if not, the process continues with block 32. Assuming that at least one of the tables has not been analyzed, then at block 32, a table is selected and removed from the list. At block 36, the timestamp as to when the last modification occurred for the selected table is retrieved from the table modification recorder 16 of FIG. 1. At decision block 38, the process determines whether the timestamp is more recent then the last time that the process, that is, a poll, was performed. If so, the process continues with block 40 and if not, then the modification was previously analyzed so there is no need to analyze it again and the process returns to decision block 30. Assuming that the timestamp is more recent than the last poll time, at block 40, the count of the number of modifications that have occurred to the selected table is retrieved from the table modification recorder 16 of FIG. 1. At decision block 42, the process determines whether the count can be resolved with the information that is available. The NMS is aware of what the count was the last time that a poll was performed and how many times that it has changed the selected table since then. If the sum of these two values is equal to the count retrieved, then the count can be resolved and the process returns to decision block 30. If the sum of these two values does not equal the count retrieved, then the count can not be resolved and the process continues with block 44. The failure of the count resolution indicates that some source other than the NMS has modified the selected table. As a result, at block 44, the process retrieves the modified rows for the selected table from the row modification recorder 18 of FIG. 1 and continues with decision block 30. Alternatively, the entire table may be retrieved rather than just the modified rows. Returning to decision block 30 and assuming that the list of tables generated in block 28 is empty, at block 34, the present time is recorded as the time for the last poll and the process ends. Depending on the circumstances, the process of FIG. 3 may be repeated at predetermined time intervals, in response to predetermined events, or both.

The processes of FIGS. 2 and 3 are repeated by each NMS for each network device that it wishes to monitor. As a whole, the present invention provides for an efficient means for detecting data modifications in MIB tables by an SNMP NMS device.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for detecting data modifications in Management Information Base (MIB) tables, the method comprising:

selecting a MIB table that has been modified;

determining whether a most recent modification is more recent than a recorded time indicating the last time that a poll was performed and when the most recent modification is more recent, retrieving a count of the number of modifications that have been performed on the selected MIB table; and determining whether the count can be resolved and when the count can not be resolved, retrieving at least one modified row for the selected table.

2. A computer-readable medium having stored thereon computer-executable instructions for performing a method for detecting data modifications in Management Information Base (MIB) tables, the method comprising:

selecting a MIB table that has been modified;

determining whether a most recent modification is more recent than a recorded time indicating the last time that a poll was performed and when the most recent modification is more recent, retrieving a count of the number of modifications that have been performed on the selected table; and determining whether the count can be resolved and when the count can not be resolved, retrieving at least one modified row for the selected table.

3. An apparatus for detecting data modifications in Management Information Base (MIB) tables, the apparatus comprising:

means for selecting a MIB table that has been modified;

means for determining whether a most recent modification is more recent than a recorded time indicating the last time that a poll was performed and means for, when the most recent modification is more recent, retrieving a count of the number of modifications that have been performed on the selected table; and means for determining whether the count can be resolved and means for, when the count can not be resolved, retrieving at least one modified row for the selected table.

4. A method for initializing a system for detecting data modifications in Management Information Base (MIB) tables, the method comprising:

identifying at least one unregistered MIB table to be monitored for modifications;

registering the identified table;

initializing a count of the number of modifications that have been performed on the identified table; and initializing a timestamp as to when a last modification was performed on the identified table.

5. The method as defined in claim 4, further comprising:

determining whether an observation of change notifications is desired or required for the identified table; and when the observation of change notifications is desired or required, enabling observation for the identified table.

6. The method as defined in claim 4, further comprising registering a callback function for each registered table.

7. A computer-readable medium having stored thereon computer-executable instructions for performing a method for initializing a system for detecting data modifications in Management Information Base (MIB) tables, the method comprising:

identifying at least one unregistered MIB table to be monitored for modifications;

registering the identified table;

initializing a count of the number of modifications that have been performed on the identified table; and initializing a timestamp as to when a last modification was performed on the identified table.

8. The computer readable medium as defined in claim 7, wherein the method further comprises:

determining whether an observation of change notifications is desired or required for the identified table; and when the observation of change notifications is desired or required, enabling observation for the identified table.

9. The computer readable medium as defined in claim 7, wherein the method further comprises registering a callback function for each registered table.

10. An apparatus for initializing a system for detecting data modifications in Management Information Base (MIB) tables, the apparatus comprising:

means for identifying at least one unregistered MIB table to be monitored for modifications;

means for registering the identified table;

means for initializing a count of the number of modifications that have been performed on the identified table; and means for initializing a timestamp as to when a last modification was performed on the identified table.

11. The apparatus as defined in claim 10, further comprising:

means for determining whether an observation of change notifications is desired or required for the identified table; and means for, when the observation of change notifications is desired or required, enabling observation for the identified table.

12. The apparatus as defined in claim 10, further comprising means for registering a callback function for each registered table.

13. A network device for detecting data modifications in Management Information Base (MIB) tables, the device comprising:

a table registrar for registering at least one MIB table to be monitored for modifications;

a notification controller for identifying at least one Network Management System (NMS) that has registered a table with the table registrar and for selectively generating notices as prescribed by the at least one NMS;

a table modification recorder for identifying which tables have been modified, for maintaining a timestamp as to when the last modification was performed on a particular table, and for maintaining a count of the number of modifications that have been performed on the particular table; and a row modification recorder for identifying which rows of a registered table have been modified, for identifying a type of modification, and for maintaining a copy of the row as modified.

14. The network device as defined in claim 13, further comprising a registered callback function for logging a modification record when a registered table experiences a modification.

15. A network device for detecting data modifications in Management Information Base (MIB) tables, the device comprising:

means for registering at least one MIB table to be monitored for modifications;

means for identifying at least one Network Management System (NMS) that has registered a table with the table registrar;

means for selectively generating notices as prescribed by the at least one NMS;

means for identifying which tables have been modified;

means for maintaining a timestamp as to when the last modification was performed on a particular table;

means for maintaining a count of the number of modifications that have been performed on the particular table;

means for identifying which rows of a registered table have been modified;

means for identifying a type of modification; and means for maintaining a copy of the row as modified.

16. The network device as defined in claim 15, further comprising means for logging a modification record when a registered table experiences a modification.

* * * * *